Oct. 19, 1948.  J. G. SISKA  2,451,780
FLEXIBLE MESH BRACELET AND METHOD OF MANUFACTURE
Filed July 25, 1947  6 Sheets-Sheet 1
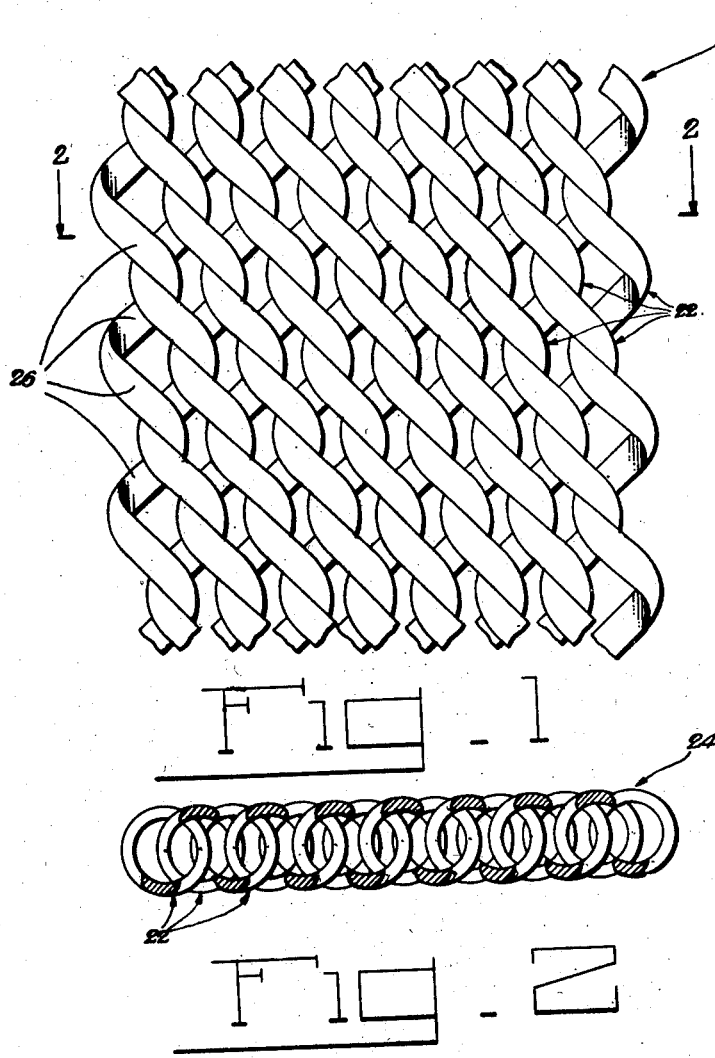
INVENTOR
JOHN G. SISKA
BY Edwin Reischer
ATTORNEY

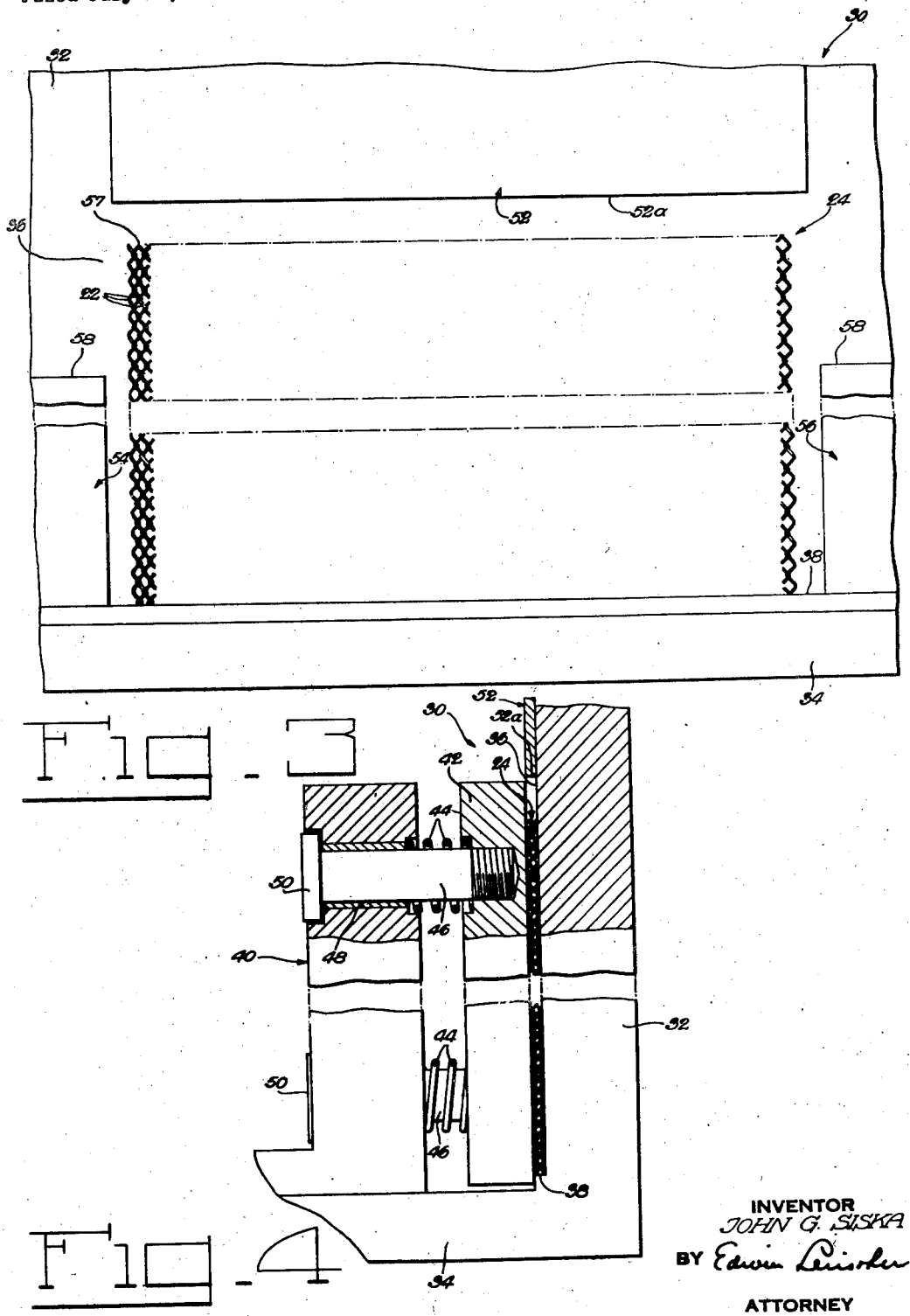

Oct. 19, 1948. J. G. SISKA 2,451,780
FLEXIBLE MESH BRACELET AND METHOD OF MANUFACTURE
Filed July 25, 1947 6 Sheets-Sheet 3
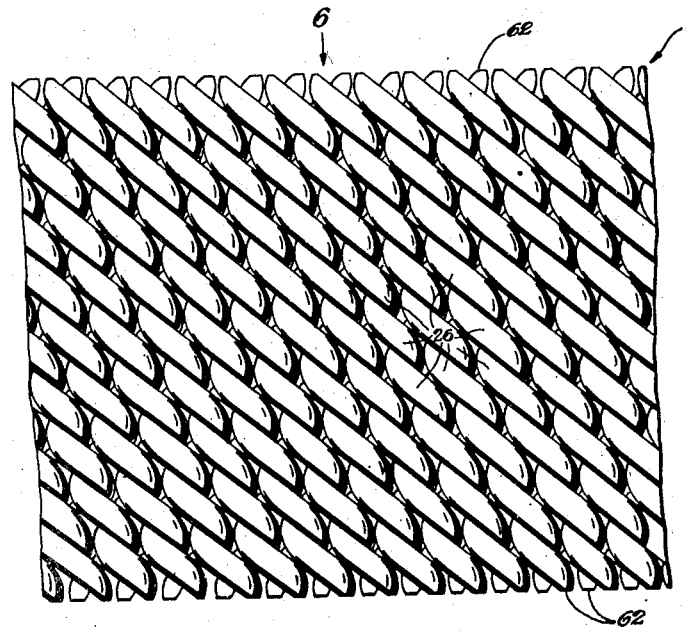
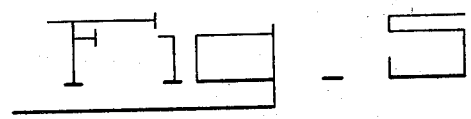
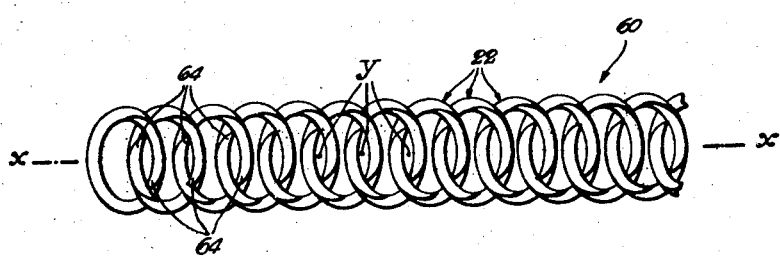
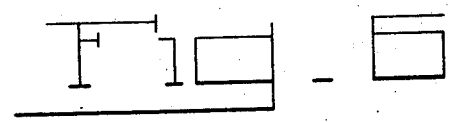
INVENTOR
JOHN G. SISKA
BY
ATTORNEY Oct. 19, 1948.                    J. G. SISKA                    2,451,780
                FLEXIBLE MESH BRACELET AND METHOD OF MANUFACTURE
Filed July 25, 1947                                          6 Sheets-Sheet 4
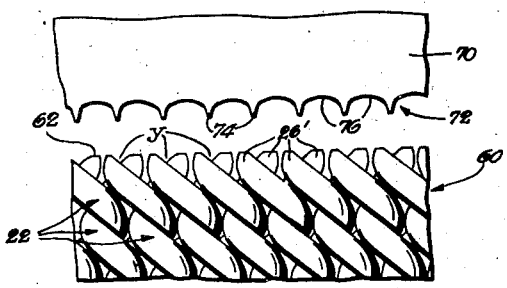 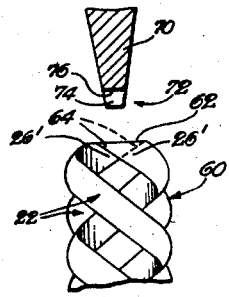
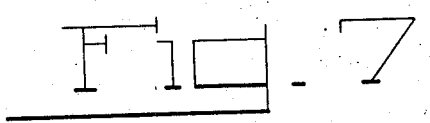 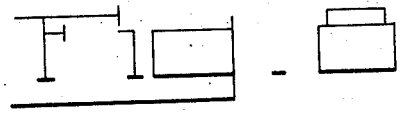
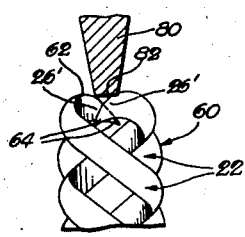 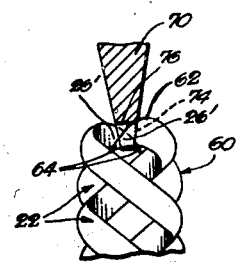
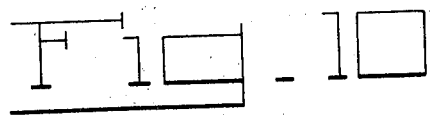 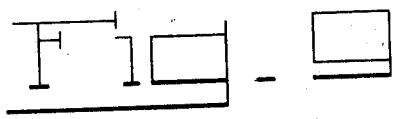
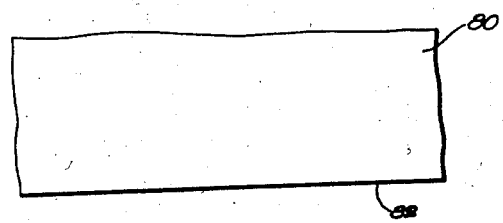
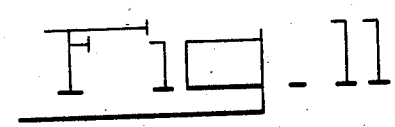
INVENTOR
JOHN G. SISKA
BY *Edwin Leinoski*
ATTORNEY

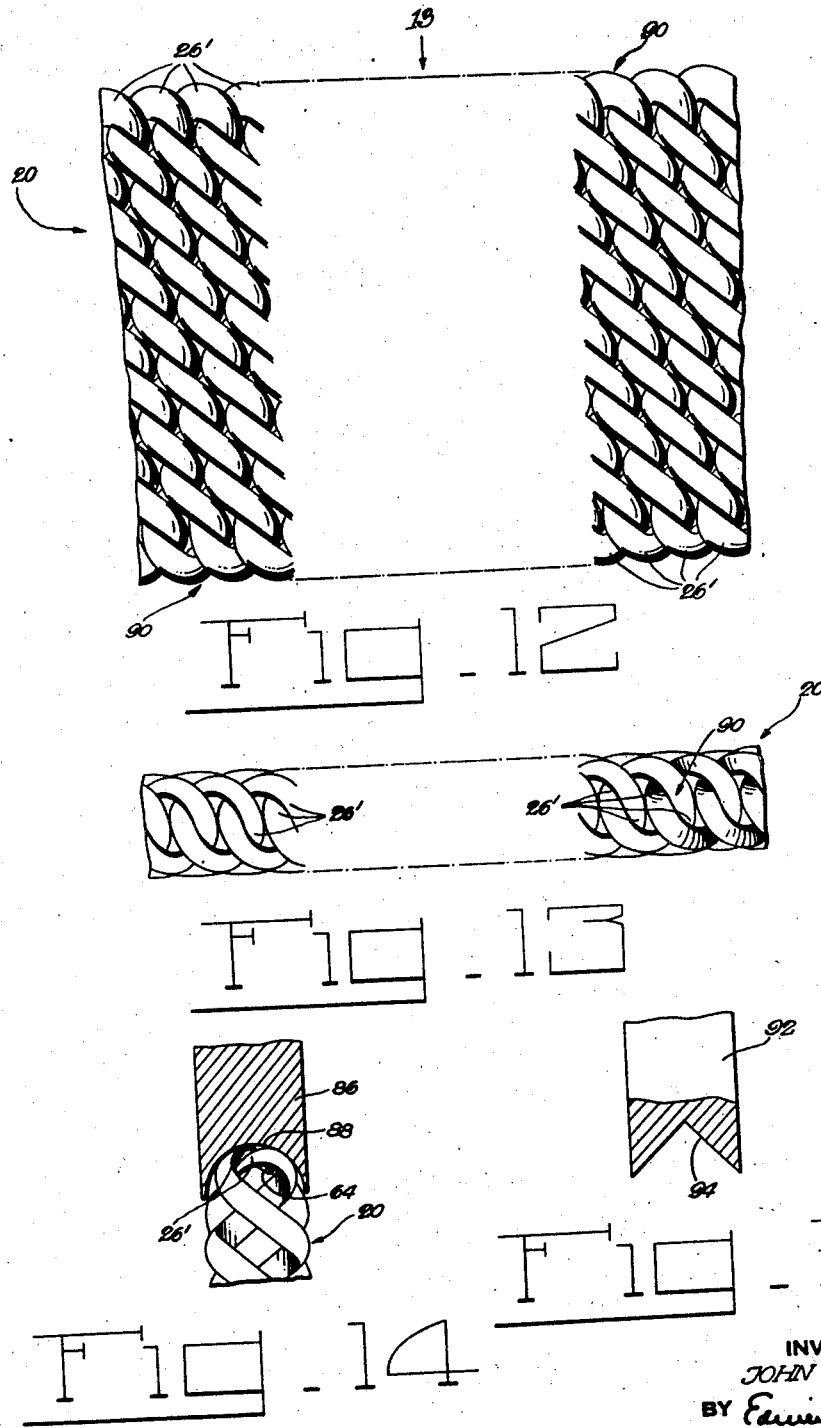

Oct. 19, 1948.  J. G. SISKA  2,451,780
FLEXIBLE MESH BRACELET AND METHOD OF MANUFACTURE
Filed July 25, 1947  6 Sheets-Sheet 6
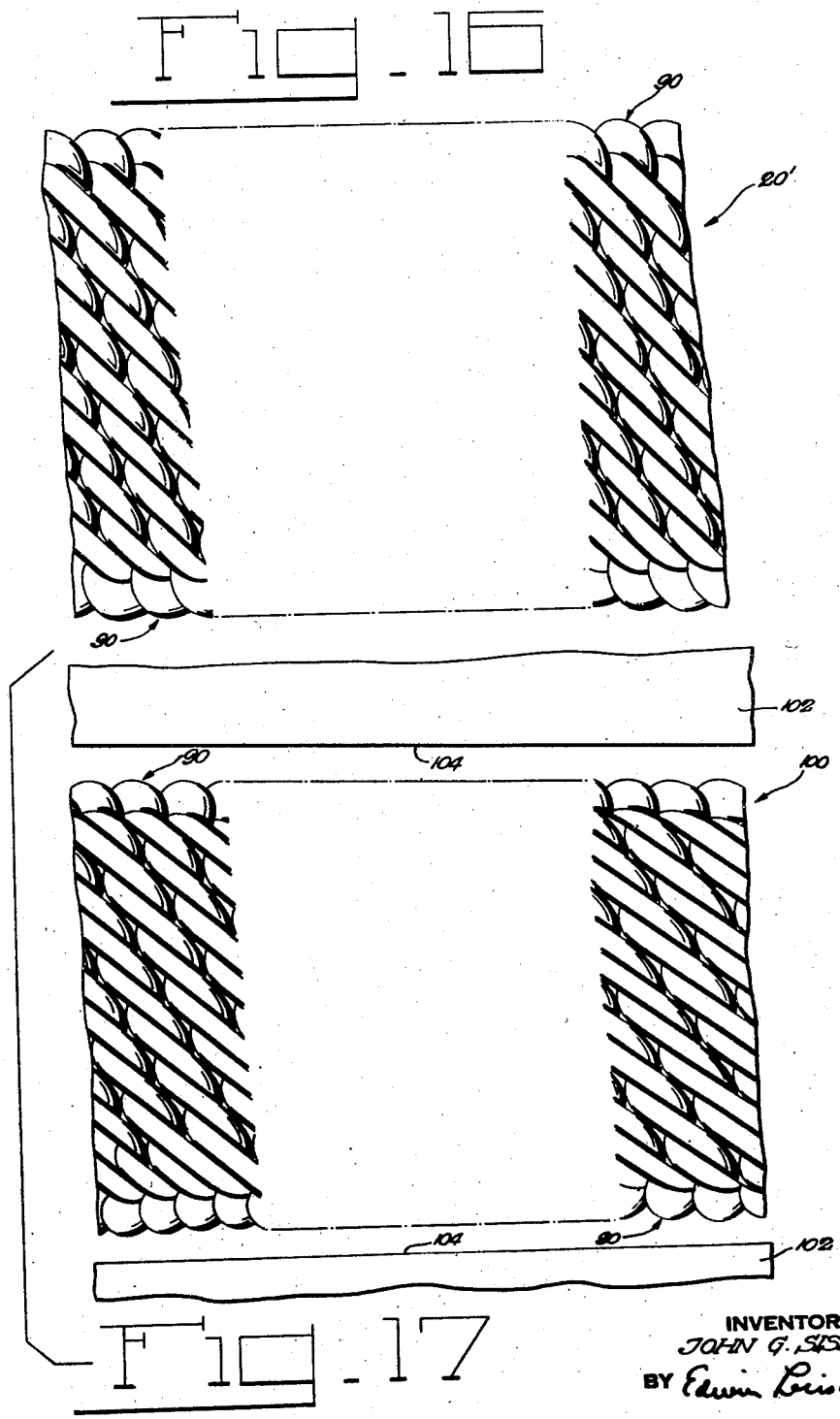
INVENTOR
JOHN G. SISKA
BY Edwin Leister
ATTORNEY Patented Oct. 19, 1948

2,451,780

UNITED STATES PATENT OFFICE 2,451,780

FLEXIBLE MESH BRACELET AND METHOD OF MANUFACTURE

John G. Siska, North Cresskill, N. J., assignor to Jacques Kreisler Manufacturing Corporation, North Bergen, N. J., a corporation Application July 25, 1947, Serial No. 763,673

11 Claims. (Cl. 63—4)

This invention relates to bracelets or the like, and more particularly to bracelets for wrist watches and to a method of making the same.

It is the primary object of the present invention to provide a highly ornamental, flexible bracelet which, though fabricated solely from identical, extremely simple and inexpensive links, hides completely the identity of the individual links.

It is another important object of the present invention to join the individual links so that the ensuing bracelet, while slender and delicate in appearance, has extraordinary tensile strength and will defy all ordinary attempts at its destruction.

It is another important object of the present invention to provide a bracelet of this type which is tapered lengthwise.

It is another important object of the present invention to devise a method of fabricating bracelets of this type which lends itself to highly efficient mass production of the bracelet at extremely low cost.

The above and other objects, features and advantages of the present invention will be more fully understood from the following description considered in connection with the accompanying illustrative drawings.

In the drawings:

Fig. 1 shows, greatly enlarged, an initial assembly of individual links as they are coordinated as the first step in their formation into a bracelet of the present type;

Fig. 2 is a section through the coordinated links, taken on the line 2—2 of Fig. 1;

Fig. 3 is a fragmentary front elevational view of a fixture used in the manufacture of the present bracelet;

Fig. 4 is a side elevation, partly in section, of the fixture shown in Fig. 3;

Fig. 5 shows, greatly enlarged, a bracelet in an intermediate stage of its formation;

Fig. 6 is an edge view of the partly finished bracelet, as viewed in the direction of the arrow 6 in Fig. 5;

Fig. 7 shows a tool used in the further formation of the partly finished bracelet;

Fig. 8 shows the tool in cross-section and in position prior to its performance on the partly finished bracelet;

Fig. 9 is a view similar to Fig. 8, showing the tool in the performance of its designated function;

Fig. 10 illustrates the same performance on the partly finished bracelet by a modified tool;

Fig. 11 shows the modified tool in elevation;

Fig. 12 shows, greatly enlarged, a short section of the finished bracelet;

Fig. 13 is an edge view of the finished bracelet, as viewed in the direction of the arrow 13 in Fig. 12;

Fig. 14 is a fragmentary cross-section through a greatly enlarged tool used for forming the partly finished bracelet into final form;

Fig. 15 is a fragmentary cross-section through a greatly enlarged, modified tool that performs like that shown in Fig. 14;

Fig. 16 shows a greatly enlarged, modified bracelet in an intermediate stage of its formation; and Fig. 17 shows the modified bracelet in its final form.

Referring to the drawings, the reference numeral 20 designates a bracelet (Fig. 12) which is fabricated solely from individual links 22 (Figs. 1 and 2). The links 22 are in the form of spirals made preferably from metal of flat, or relatively flat, stock. In the present instance, the spiral links 22 are made from half-round stock as shown in Fig. 2. Preferably, the links 22 are all identical, i. e., of the same dimensions and wound uni-directionally.

In manufacturing bracelets of the type illustrated in Fig. 12, there is first formed a pre-assembly 24 of joined links 22. To this end, a multitude of links 22, each preferably of a length several times that of the width of a finished bracelet, are interwound or interlaced in the manner best shown in Figs. 1 and 2.

The pre-assembly 24 of links thus formed is then compressed into a mat or blank of the general pattern or texture shown in Fig. 5, in which the convolutions 26 of the adjacent links 22 are in the closely intermeshed or interlocked relation shown. This is accomplished by compressing the link assembly 24 edgewise in two transverse directions. To this end, there may be provided a fixture 30 (Figs. 3 and 4), comprising a bracket 32 having a base 34 and being provided with a backing surface 36 and supporting shoulder 38 on which the link assembly 24 is placed. Suitably guided on the base 34 of the bracket 32 for movement to and from the backing surface 36 is the latter is a slide 40, carrying a pressure plate 42 which is adapted to cooperate with the surface 36 and shoulder 38 of the bracket in forming a recess in which to compress the link assembly 24. For a reason hereinafter described, the links 22 in assembly 24 are, in the present instance, permitted to expand in the direction of the thickness of the assembly during the referred edgewise compression of the latter. To this end, the pressure plate 42 is yieldingly carried on the slide 40 by means of interposed compression springs 44 and studs 46. The studs 46 may be anchored in the pressure plate 42 and extend through bushings 48 in the slide 40. The studs 46 are provided with heads 50 which serve as limit stops for the pressure plate 42 in its most advanced position.

After placing a link assembly 24 into the fixture 30, as described and as shown in Fig. 3, the retracted slide 40 is advanced until the pressure plate 42 bears, and preferably exerts a slight pressure, against the located link assembly 24. The slide 40 is then suitably held against retraction from this advanced position. The link assembly 24 is then compressed by movable, preferably power-operated, rams 52, 54 and 56. In the present instance, ram 52 first performs its compressing function while the other rams 54 and 56 are retracted from the link assembly 24, as shown in Fig. 3. The ram 52 is lowered from the raised position shown in Fig. 3 to engage the ajacent edge 57 of the link assembly 24 and compress the latter axially of the links 22 thereof. The compression of the link assembly 24 by the ram 52 is concluded when the latter reaches its lowermost position in which the operating surface 52a thereof is substantially flush with the sides 58 of the rams 54 and 56. The ram 52 remains in its lowermost position while the rams 54 and 56 perform their compressing function on the partially compressed link assembly 24, thereby accomplishing uniform compression, in two transverse directions, of the link assembly 24 throughout its extent. The rams 54 and 56 are preferably simultaneously advanced from their retracted positions (Fig. 3) to engage the adjacent sides, respectively, of the link assembly 24 and compress the latter. The rams 52, 54, 56 and the slide 40 are then retracted to permit the removal from the fixture 30 of the compressed link assembly 24 which is now in the form of a mat or blank of the texture shown in Fig. 5, and which is naturally considerably smaller in surface area than the link assembly 24 in its initial state (Fig. 1).

During the described compression of the link assembly 24, particularly by the rams 54 and 56, the links 22 in the assembly 24, being restrained from expanding in any direction except in the direction in which the pressure plate 40 yields (Fig. 4), will expand in the latter direction. Thus, the originally round convolutions of the links 22 (Fig. 2) are, in the compressed mat or blank, of the oblong or oval shape shown in Fig. 6, resulting in an according increase in the thickness of the compressed blank over that of the link assembly 24 in its original state.

The compressed blank, though smaller in surface area than the link assembly 24 in its original state, is nevertheless of a width which is several times that of a finished bracelet. Hence, a number of bands 60 (Fig. 5), each of the approximate width of a finished bracelet, may be cut from the compressed blank by any suitable means. Preferably, bands 60 are so cut from the compressed blank that the adjacent ends 64 of adjacent links 22 at the "raw" edges 62 of the bands are located on opposite sides, respectively, of the median planes x—x of the latter, as shown in Fig. 6.

Each band 60 is finish-formed into a bracelet by forming the opposite "raw" edges 62 thereof. This is accomplished, in the present instance, in two steps. In the first step, the adjacent ends 64 of the links 22 in a band 60 are projected or tucked into these links (Fig. 9). In the second step, the adjacent end convolutions 26' of the links 22 in the band are curled toward each other and braided in the fashion shown in Figs. 13 and 14.

The first step of tucking the adjacent ends 64 of the links 22 in a band 60 is performed with a tool 70 (Figs. 7 to 9) which is preferably wedge-shaped in cross section and has a rack-like operating surface 72 of which the tooth-like projections 74 are joined by preferably rounded bases 76. For a tucking operation by the tool 70, a band 60 is preferably removably placed in any suitable fixture (not shown) in which it is held against expansion in any direction in the position shown in Fig. 8 relative to the tool 70. The tool 70 is preferably a hand or power-operated ram which is movable to and from the adjacent edge 62 of the band. More particularly, the band 60 is so aligned with the tool 70 that, on descent of the latter from the raised position shown in Figs. 7 and 8, the tooth-like projections 74 thereof enter the ajacent band edge 62 at the points y (Figs. 6 and 7). When the projections 74 thus enter the band edge 62 at the points y thereof, the adjacent ends 64 of adjacent links 22 in the band are forced apart, and thus conditioned for their subsequent inward formation by the tool 70 without obstruction from the nearest convolutions of the adjacent links 22 in the band. The subsequent inward formation or tucking of the link ends 64 (Fig. 9) is accomplished by the rounded bases 76 of the tool 70 on continued descent of the latter, as will be readily understood.

A simpler, modified tucking tool 80 may be used in lieu of the tool 70 (Figs. 10 and 11). This modified tool is in all respects like the tool 70, except that its operating surface 82 is plane and devoid of any projections. The performance of the modified tool 80 on a band edge 62 is substantially the same as that of the tool 70, although the latter tool is preferred due to the more uniform disposition of the tucked-in ends 64 by the projections 74.

At one operation of the tool 70 or modified tool 80, the link ends 64 along one band edge 62 only are tucked in, whereupon the band is inverted so as to present its other edge 62 to the tool for a tucking operation. It is also contemplated to provide oppositely operable tools 70 or 80, and suitably to hold a band 60 in such relation thereto that the simultaneously operating tools tuck in the link ends 64 along both band edges 62 in one operation of these tools.

For performing the above-described second step in the formation of the band edges 62, recourse is had to a tool 86 (Fig. 14) which has a preferably semi-cylindrical operating surface 88. For an operation of tool 86 on a band 60, the latter is placed and held in a suitable fixture (not shown), the same as for a tucking operation. The tool 86 is a hand or power-operated ram which is movable to and from the adjacent edge 62 of the band 60. While the band 60 is held in the fixture, as mentioned, and on descent of the tool 86 from a raised position into the position shown in Fig. 14, the operating surface 88 thereof engages the adjacent band edge 62 and curls the adjacent end convolutions 26' of the links 22 in the band into dome-like formations (Fig. 14) which, when viewed edgewise of the band, have the interbraided appearance shown in Fig. 13.

Instead of using only one curling tool 86 and inverting the band 60 after the formation of one finished edge 90 thereof for the finish-formation by the tool 86 of the opposite, partly-finished band edge 62, it is also contemplated to provide oppositely operating curling tools 86 that may simultaneously perform their curling functions on the opposite edges 62, respectively, of the band.

Fig. 15 shows a modified curling tool 92 which may be used in lieu of the tool 86, and which has a V-shaped operating surface 94 instead of a semi-cylindrical operating surface. The performance of the modified tool 92 upon a band edge 62 is the same as that of the tool 86.

The instant bracelet 20 (Fig. 12) is nonstretchable, but is sufficiently flexible to bend easily around a person's wrist if used as a wrist-watch band, for instance. The flexibility of the bracelet springs from the described interlacement of the separate links 22 from which the same is fabricated, which permits them to pivot relative to each other about axes parallel to their longitudinal axes. The links 22 in the bracelet 20 are otherwise substantially immovable relative to each other due to the close interlock of their convolutions, resulting from the inevitable mutual deformation of the adjacent convolutions of adjacent lengths at their intersections, in consequence of the explained compression of the original link assembly 24 in two transverse directions. Due to the interlacement and interlock of the links in the bracelet, the latter has extraordinary tensile strength which defies all ordinary efforts at its destruction. The links 22 may be very small in dimensions so that the bracelet appears slender and has little bulk. In fact, the bracelet may be fabricated from such diametrically small links 22 that the bracelet would, if it were not thickened during the compression, as explained, appear excessively slender and weak. The convolutions 26 of the links 22 in the bracelet are so closely interlocked that the individual links lose their identity as such and together form an extremely delicate and uniform pattern that suggests the most tedious and perfect workmanship of a skilled craftsman. The oblong formation of the convolutions 26 of the links 22 during their described compression also enhances the delicacy of the texture on either face of the bracelet.

It is also contemplated to make a bracelet of the instant type which is tapered in the direction of its length. Such a tapered bracelet is indicated at 100 in Fig. 17. This bracelet 100 is, prior to its subjection to a final operation to be described, exactly like the previously described bracelet 20 with the parallel finished edges 90, except that the links 22 in the tapered bracelet 100 are initially axially compressed by the ram 52 (Fig.3) to a lesser extent than the links in the bracelet 20. This is readily accomplished by imparting a shorter work stroke to the ram 52 in its performance on the same link assembly 24. Thus, Fig. 16 shows a bracelet 20' which is made in every respect like the bracelet 20, except that the links 22 thereof are axially less compressed than in the latter bracelet. Having formed a bracelet 20', the same is, for its taper formation, subjected to opposite hand or power-operated rams 102 (Fig. 17), the confronting operating surfaces 104 of which are inclined to each other to the extent to which the opposite edges 90 of the bracelet are to be tapered. While the bracelet is removably held in any suitable fixture (not shown) against widthwise expansion, the rams 102 are moved toward each other to engage the adjacent edges 90, respectively, of the bracelet and edgewise compress the latter into the tapered form shown in Fig. 17.

While the foregoing description has dealt with the formation of a supply blank from which a number of bands 60 are cut, it is, of course, fully within the scope of the present invention to make a band 60 directly from correspondingly short links 22, by interlacing them to form a pre-assembly of pivotally connected links, and then compressing said pre-assembly lengthwise and widthwise thereof while permitting it to expand in the direction of its thickness. The side edges of a band thus formed are then finished in the same manner as the side edges 90 of the described bracelet 20.

While I have shown and described preferred embodiments of my invention, it will be understood that various changes may be made in the present invention without departing from the underlying idea or principles of the invention within the scope of the appended claims.

Having thus described my invention, what I claim and desire to secure by Letters Patent is:

1. A flexible bracelet band, comprising a series of spiral elements arranged side-by-side with the convolutions of adjacent elements interlaced with each other for pivotal connection of the latter, and the interlaced convolutions of adjacent elements being at their intersections mutually deformed into mutual limited interlocked relation to prevent relative movement, other than restricted pivotal relative movement, between said adjacent elements.

2. A flexible bracelet band, comprising a series of spiral elements arranged side-by-side with the convolutions of adjacent elements interlaced with each other for pivotal connection of the latter, the interlaced convolutions of adjacent elements being so disposed in each other as to form a substantially closed mesh, and being at their intersections mutually deformed into mutual limited interlocked relation to prevent relative movement, other than restricted pivotal relative movement, between said adjacent elements.

3. A flexible bracelet band, comprising a series of spiral elements arranged side-by-side with the convolutions of adjacent elements interlaced with each other for pivotal connection of the latter, each element being formed of substantially flat band stock disposed widthwise substantially parallel to the longitudinal axis of said element, the interlaced convolutions of adjacent elements being so disposed in each other as to form a substantially closed mesh, and being at their intersections mutually deformed into mutual limited interlocked relation to prevent relative movement, other than pivotal relative movement, between said adjacent elements.

4. A flexible bracelet band, comprising an assembly of spiral elements arranged side-by-side with the convolutions of adjacent elements interlaced with each other for pivotal connection of the latter, said elements being wider in the direction of the thickness of the assembly than in the direction of the length thereof, the interlaced convolutions of adjacent elements being so disposed in each other as to form a substantially closed mesh, and being at their intersections mutually deformed into mutual limited interlocked relation to prevent relative movement, other than restricted pivotal relative movement, between said adjacent elements.

5. A flexible bracelet band, comprising an assembly of spiral elements arranged side-by-side with the convolutions of adjacent elements interlaced with each other for pivotal connection of the latter, the convolutions of said elements being oval-like in shape and said elements being disposed in the assembly so that they extend with the longer axes of their oval convolutions in the direction of the thickness of the assembly, the interlaced convolutions of adjacent elements being so disposed in each other as to form a substantially closed mesh, and being at their intersections mutually deformed into mutual limited interlocked relation to prevent relative movement, other than restricted pivotal relative movement, between said adjacent elements.

6. A flexible bracelet band, comprising an assembly of spiral elements arranged side-by-side with the convolutions of adjacent elements interlaced with each other for pivotal connection of the latter, the interlaced convolutions of adjacent elements being so disposed in each other as to form a substantially closed mesh, and being at their intersections mutually deformed into mutual limited interlocked relation to prevent relative movement, other than restricted pivotal relative movement, between said adjacent elements, and the opposite side edges of said assembly being tapered.

7. In a method of making a flexible bracelet band according to which a series of spiral elements are interlaced with each other to form a chain of pivotally connected elements, that improvement which comprises compressing the chain, while holding it against lengthwise and widthwise buckling, substantially lengthwise and widthwise into a substantially closed mesh in which the interlaced convolutions of adjacent elements are at their intersections mutually deformed into mutual limited interlocked relation to prevent relative movement, other than restricted pivotal relative movement, between said adjacent elements.

8. In a method of making a flexible bracelet band according to which a series of spiral elements are interlaced with each other to form a chain of pivotally connected elements, that improvement which comprises compressing the chain, while holding it against lengthwise and widthwise buckling, substantially lengthwise and widthwise into a substantially closed mesh in which the adjacent convolutions of adjacent elements are in such forced engagement with each other at their mutual points of engagement that said elements are interlocked against relative movement, other than restricted pivotal movement, relative to each other.

9. In a method of making a flexible bracelet band according to which a series of spiral elements of round convolutions are interlaced with each other to form a chain of pivotally connected elements, that improvement which comprises compressing the chain lengthwise and widthwise, while preventing lengthwise and widthwise buckling of the chain and yieldingly permitting expansion of the same in the direction of its thickness, whereby the elements are formed into a substantially closed mesh in which the convolutions of the elements are of oblong shape and extend with their longer dimensions in the direction of the thickness of the chain, and the adjacent convolutions of adjacent elements are in such forced engagement with each other at their mutual points of engagement that said elements are interlocked against relative movement other than restricted pivotal movement relative to each other.

10. In a method of making a flexible bracelet band according to which a series of spiral elements are interlaced with each other to form a chain of pivotally connected elements in which identical end lengths of adjacent end convolutions, respectively, of adjacent elements extend oppositely to each other into the confines of the adjacent elements, respectively, and each element is formed of substantially flat band stock disposed widthwise substantially parallel to the longitudinal axis of said element, that improvement which comprises compressing the chain, while holding it against lengthwise and widthwise buckling, substantially lengthwise and widthwise into a substantially closed mesh in which the adjacent convolutions of adjacent elements are in such forced engagement with each other at their mutual points of engagement that said elements are interlocked against relative movement other than restricted pivotal movement relative to each other, and then oppositely curling and twisting said adjacent end lengths of adjacent endmost convolutions, respectively, of adjacent elements into mutual dome-like formation.

11. In a method of making a flexible bracelet band according to which a series of identical spiral elements are interlaced with each other to form a chain of pivotally connected elements, that improvement which comprises uniformly compressing the chain, while holding it against lengthwise and widthwise buckling, lengthwise and widthwise into a nearly closed mesh in which the adjacent convolutions of adjacent elements are in such forced engagement with each other at their mutual points of engagement that said elements are interlocked against relative movement other than restricted pivotal movement relative to each other, and then further compressing the chain widthwise to a gradually varying extent from one end to the other end thereof, while holding the chain against widthwise buckling, whereby to taper the chain lengthwise.

JOHN G. SISKA.

REFERENCES CITED

The following references are of record in the file of this patent:

UNITED STATES PATENTS

| Number | Name | Date |
|---|---|---|
| 124,286 | Peters | Mar. 5, 1872 |
| 259,989 | Pickhardt | June 20, 1882 |
| 298,432 | Vester | May 13, 1884 |
| 345,735 | Scarles | July 20, 1886 |
| 410,250 | Midgley | Sept. 3, 1889 |
| 410,251 | Midgley | Sept. 3, 1889 |
| 851,288 | Hodges | Apr. 23, 1907 |
| 1,773,426 | Haiss | Aug. 19, 1930 |
| 1,784,786 | Durand | Dec. 9, 1930 |
| 1,807,440 | Schraysshuen et al. | May 26, 1931 |
| 1,880,537 | Wadman | Oct. 4, 1932 |
| 2,054,408 | Casey | Sept. 15, 1936 |